May 19, 1931.  H. F. SHINDEL  1,805,640
ADJUSTING MEANS FOR GOGGLES
Filed Oct. 1, 1930
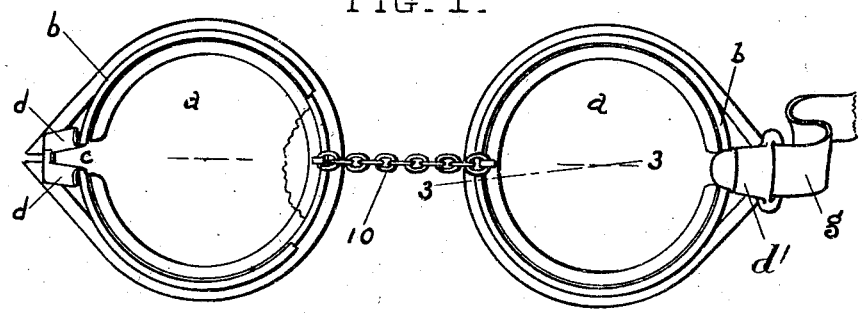
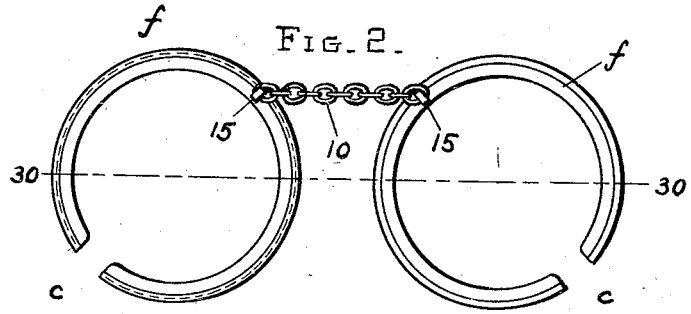
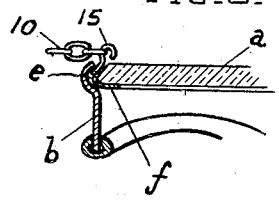
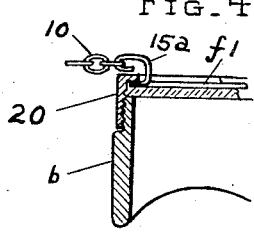
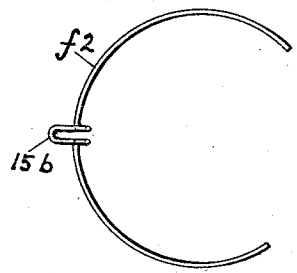
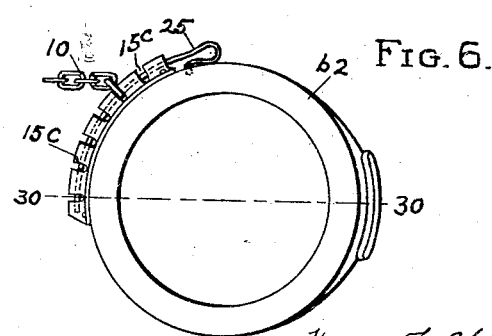
Inventor
Harry F. Shindel
By
Attorneys Patented May 19, 1931

1,805,640

UNITED STATES PATENT OFFICE

HARRY F. SHINDEL, OF READING, PENNSYLVANIA, ASSIGNOR TO WILLSON PRODUCTS, INC., OF READING, PENNSYLVANIA, A CORPORATION OF PENNSYLVANIA

ADJUSTING MEANS FOR GOGGLES

Application filed October 1, 1930. Serial No. 485,643.

My invention relates to goggles or eye glasses which are made up of separate lens-holding frames and a combining nose bridge; and it consists in improved means for effecting such connection, particularly with a view to enabling convenient and satisfactory variation of the spread of the lens frames to suit various faces; as fully set forth by reference to the accompanying drawings illustrating a specific embodiment thereof, with the novel features clearly defined in the subjoined claims.

Fig. 1 is a front view of a pair of known lens-clamping goggle frames having my variable bridge connection applied thereto in the form of a rotative ring; the bridge being shown as unclampedly set in line with the centres of the eye cups so as to spread the latter to a maximum distance permitted by the length of the connecting bridge.

Fig. 2 is a similar view to Fig. 1 showing the rotative bridge connections only, as set to adjusted positions which close together the lens frames, the bridge being out of alinement with the lens centres.

Fig. 3 is a cross-sectional view on the line 3—3 of Fig. 1; and Fig. 4 shows similar application of the invention to a screw-cap type of goggles.

Fig. 5 indicates a modified form of rotatively adjustable bridge-connection; and Fig. 6 illustrates a modified construction which embodies my main invention without the preferred rotative adjustment feature.

In the goggles particularly indicated in the drawings, each glass or lens $a$ is removably clamped in a known type of sheet metal eye-cup frame $b$, the latter being shown as split at $c$ so as to be expansible for insertion or loosening of the lens in a circular recess $e$ of the frame, and as clampable upon the lens by means of a coupling wedge (not shown) adapted to engage the meeting ends $dd$ of the split frame; this indicated lens-clamping construction corresponding with that shown in Willson Patent No. 1,306,367, and my present invention being illustrated as preferably applied thereto in connection with a lens-encircling ring $f$ such as is employed in said prior patent.

The separate lens-clamping frames $bb$ are commonly connected by a flexible nose-bridge the length of which can be adjusted to desiredly vary the spread of the lens centers; but in my improved construction such adjustment of the length of the bridge is dispensed with and a fixed length chain bridge is employed as indicated at 10.

The essential purpose of my invention is to so connect the head-secured lens frames $bb$ by means of the nose-bridge, as to enable satisfactory adjustment of the spread of the frame to suit the face of any wearer without correspondingly varying the length of the nose-bridge 10 as heretofore; and the essential feature thereof consists in providing each frame with a variable nose-bridge connection whereby determined arrangement of the nose-bridge more or less out of alinement with the line 30—30 through the lens frame centers, may be effected so as to correspondingly reduce the distance between the latter when the goggles are normally secured to the face as by head bands $g$.

This is accomplished in the specific construction shown in Figs. 1 to 3, by providing the known lens ring $f$ which is entered in the frame recess $e$, with a bridge-connecting extension 15 to which a link of the nose-guard chain may be attached; this bridge-connecting device being rotatively movable in the recess $e$ of unclamped frame so as to provide for required adjustment for bringing the connected frames determinedly closer together as indicated in Fig. 2.

This turning movement of the rotatively adjustable bridge connection 15, is readily effected when the clamping action upon the lens $a$ is released,—that is, in the construction particularly illustrated, when the split frame $b$ is expanded by withdrawal of the clamping wedge $d'$ from the meeting ends $dd$ of the split frame; and after setting of the connection 15 to required position relative to the frame, it may be clamped in such position simultaneously with the clamping of the lens. The attachment or disconnection of the link-chain bridge 10 to the particular open-hook bridge connection 15 shown in Fig. 3, is effected when the lens is removed, and placing of the lens closes the hook so as to prevent unintended detachment.

In the different lens frame construction indicated in Fig. 4, the clamping of the lens and of the adjustable bridge connection 15ª, is similarly effected by means of a screw cap 20 such as is commonly employed with molded eye-cups; the connection 15ª being the extension of an ordinary lens-seat ring $b'$ which is also rotatively adjustable to vary the spread of the frames as above described.

In Fig. 5 is indicated a modified rotatively adjustable connecting ring $f^2$ of looped wire having a bridge-connecting loop 15ᵇ; which is essentially similar to the particular forms of adjustable rings shown in Figs. 1 to 4, and which may be turnably fitted to the circular lens recess $e$ of the frame and used either independently of or in connection with the known lens-encircling ring $f$ shown in Fig. 3. In all cases the so-called ring is an open one providing a spring fit in the recess $e$ of the frame.

Fig. 6 illustrates a modified construction embodying my main invention apart from the preferred provision for rotative adjustment of the bridge connection heretofore set forth; the desired variability in the connection of the lens frames by the bridge member for the purpose of varying the spread of the frames, being effected in this indicated construction, by providing each of the frames with a series of peripherally fixed bridge connections 15ᶜ, 15ᶜ, spaced apart about the centers of the frame so as to be used selectively for the attachment of the bridge ends as determined by desired spreading of the frames. The selected connection is locked as shown, by a single link-engaging pin 25 which secures the engaged bridge end in any selected connection 15ᶜ.

It will be readily understood that the flexibly connected lens frames, may be readily varied in their spacing apart to suit any particular wearer, by merely varying the location of the fixed-length bridge connection relative to the line passing through the centers of the normally applied frames, as has been fully described; and that the specific construction set forth may be readily modified within the scope of my invention as defined in the claims.

What I claim is:

1. Goggles comprising a pair of head-secured lens frames, and a connecting bridge of determined length, said frames having variable peripheral connections for the bridge ends whereby the spacing of the frame centers may be determinedly varied.

2. An adjustably-connected pair of lens frames, comprising rotatively adjustable bridge connections in the respective frames, and a bridge member attachable to said adjustable connections and serving to vary the spread of the connected frames as determined by the setting of the connections.

3. An adjustably-connected pair of lens-clamping frames, comprising rotatively adjustable bridge connections in the respective frames retainable in set position by the lens-clamping action, and a bridge member attachable to said adjustable connections and serving to vary the spread of the frames as determined by the setting of the connections.

4. An adjustably-connected pair of lens-clamping frames each of which is provided with a circular lens-receiving recess, a pair of rotatively adjustable rings in the respective frames having peripheral nose-bridge projections, and a nose-bridge flexibly connected to said projections and adapted to vary the spread of the frames as determined by the setting of said adjustable rings.

5. An adjustably-connected pair of lens-clamping frames each of which is provided with a circular lens-receiving recess, a pair of rotatively adjustable lens-retaining rings in the respective frames having peripheral nose-bridge projections, and a nose-bridge flexibly connected to said projections and adapted to vary the spread of the frames as determined by the setting of said adjustable rings.

6. An adjustably-connected pair of lens-clamping frames each of which is provided with a circular lens-receiving recess, comprising a pair of rotatively adjustable lens-retaining rings in the respective frames each adapted to be held in set position by the lens-clamping action and having peripheral nose-bridge projections, and a nose-bridge flexibly connected to said projections and adapted to vary the spread of the frames as determined by the setting of said adjustable rings.

7. An adjustably-connected pair of lens-clamping frames, comprising rotatively adjustable bridge connections in the respective frames having open-hook bridge-attaching projections, and a link bridge member attachable to said projections and adapted to vary the spread of the frames as determined by the setting of said adjustable connections.

8. An adjustably-connected pair of lens-clamping frames, comprising rotatively adjustable bridge connections in the respective frames having open-hook bridge-attaching projections, and a link bridge member attachable to said projections and adapted to vary the spread of the frames as determined by the setting of said adjustable connections; the link engagement of said bridge member with the open-hook projections being normally locked by the positioned lenses.

9. A connected pair of lens-clamping frames each of which is provided with a circular lens-receiving recess and comprising looped bridge-connecting rings rotatably adjustable in the respective lens-receiving recesses independently of the lenses, and a nose-bridge attached to the respective rings and serving to vary the spread of said frames as determined by the setting of said rings in the frames.

10. Goggles comprising a connected pair of head-secured lens frames each of which is provided with a plurality of peripherally fixed nose-bridge connections spaced-apart about the frame centers, and a nose bridge selectively attachable at each end to a selected one of said frame connections so as to determinedly spread the frame centers.

In testimony whereof I affix my signature.

HARRY F. SHINDEL.